(12) United States Patent
Karmakar et al.

(10) Patent No.: US 10,234,210 B2
(45) Date of Patent: Mar. 19, 2019

(54) RSC EXTERNAL DOWNCOMER TUBE ARRANGEMENT

(71) Applicant: General Electric Company, Schenectady, NY (US)

(72) Inventors: Pallab Karmakar, Bangalore (IN); Lien-Yan Chen, Spring, TX (US); Qiong Zhou, Houston, TX (US)

(73) Assignee: General Electric Company, Schenectady, NY (US)

( * ) Notice: Subject to any disclaimer, the term of this patent is extended or adjusted under 35 U.S.C. 154(b) by 159 days.

(21) Appl. No.: 15/246,355

(22) Filed: Aug. 24, 2016

(65) Prior Publication Data

US 2018/0058762 A1 Mar. 1, 2018

(51) Int. Cl.
*B01J 7/00* (2006.01)
*C01B 3/02* (2006.01)
*C01B 3/22* (2006.01)
*C10J 3/82* (2006.01)
*F28D 7/00* (2006.01)

(52) U.S. Cl.
CPC .............. *F28D 7/0075* (2013.01); *B01J 7/00* (2013.01); *C01B 3/02* (2013.01); *C01B 3/22* (2013.01); *C10J 3/82* (2013.01); *C01B 2203/0266* (2013.01); *C01B 2203/0283* (2013.01); *C01B 2203/0415* (2013.01); *C01B 2203/0894* (2013.01); *C01B 2203/84* (2013.01); *C10J 2300/1603* (2013.01)

(58) Field of Classification Search
CPC ............................ F28D 2021/0075; C10J 3/86
See application file for complete search history.

(56) References Cited

U.S. PATENT DOCUMENTS

| | | | | |
|---|---|---|---|---|
| 3,551,347 A | * | 12/1970 | Markert | C01B 3/22 122/333 |
| 3,977,960 A | * | 8/1976 | Stout | C10B 49/14 201/10 |
| 4,936,376 A | * | 6/1990 | Martin | C10J 3/86 122/504.2 |
| 7,055,583 B2 | * | 6/2006 | Filippi | B01J 8/0214 165/145 |
| 7,204,301 B2 | * | 4/2007 | Filippi | B01J 8/0285 165/157 |
| 7,587,995 B2 | * | 9/2009 | Kraft | C10J 3/84 122/7 R |

(Continued)

*Primary Examiner* — Matthew J Merkling
(74) *Attorney, Agent, or Firm* — Fletcher Yoder P.C.

(57) ABSTRACT

A system includes a radiant syngas cooler which receives and cools syngas generated in a gasifier. The radiant syngas cooler includes an outer shell of the radiant syngas cooler defining an annular space of the radiant syngas cooler and a heat exchange tube of the radiant syngas cooler positioned within the annular space and configured to flow a cooling medium. The heat exchange tube is configured to enable heat exchange between the syngas and the cooling medium to cool the syngas. The radiant syngas cooler includes a downcomer tube of the radiant syngas cooler which supplies the cooling medium to the heat exchange tube, where the downcomer tube includes a downflow portion positioned outside of the annular space of the radiant syngas cooler. The downflow portion is fluidly coupled to a header, and the header fluidly couples the downcomer tube to the heat exchange tube.

20 Claims, 5 Drawing Sheets

(56) References Cited

U.S. PATENT DOCUMENTS

| | | | |
|---|---|---|---|
| 2008/0041572 A1* | 2/2008 | Wessel | C10J 3/485 165/157 |
| 2009/0010821 A1* | 1/2009 | Lehr | B01J 8/008 422/600 |
| 2009/0025917 A1* | 1/2009 | Gauthier | C10J 3/86 165/157 |
| 2009/0038155 A1* | 2/2009 | Corry | B23P 15/26 29/890.046 |
| 2009/0041642 A1* | 2/2009 | Storey | F22B 1/1846 422/201 |
| 2009/0078397 A1* | 3/2009 | Storey | F01K 23/068 165/146 |
| 2009/0130001 A1 | 5/2009 | Storey et al. | |
| 2009/0173484 A1* | 7/2009 | Storey | C10J 3/82 165/177 |
| 2009/0272513 A1* | 11/2009 | Russell | F02C 3/24 165/104.32 |
| 2015/0275110 A1* | 10/2015 | Karmakar | C10J 3/86 422/201 |
| 2016/0312701 A1* | 10/2016 | Sripada | F02C 7/143 |

* cited by examiner

RSC EXTERNAL DOWNCOMER TUBE ARRANGEMENT

BACKGROUND OF THE INVENTION

The subject matter disclosed herein relates to a radiant syngas cooler and more particularly, a radiant syngas cooler configured to generate steam.

Conventional radiant syngas coolers are designed with tubes disposed within an inner, annular space of the radiant syngas cooler. The tubes disposed in the annular space of the radiant syngas cooler do not face syngas and hence do not necessarily participate in heat transfer. Additionally, disposing the tubes within the annular space of the radiant syngas cooler may add to the costs associated with constructing the radiant syngas cooler by increasing the diameter of the cooler.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a radiant syngas cooler which receives and cools syngas generated in a gasifier. The radiant syngas cooler includes an outer shell of the radiant syngas cooler defining an annular space of the radiant syngas cooler and a heat exchange tube of the radiant syngas cooler positioned within the annular space and flows a cooling medium. The heat exchange tube enables heat exchange between the syngas and the cooling medium to cool the syngas. The radiant syngas cooler includes a downcomer tube of the radiant syngas cooler which supplies the cooling medium to the heat exchange tube, where the downcomer tube includes a downflow portion positioned outside of the annular space of the radiant syngas cooler. The downflow portion is fluidly coupled to a header, and the header fluidly couples the downcomer tube to the heat exchange tube.

In a second embodiment, a system includes a radiant syngas cooler includes a plurality of platen tubes extending from one or more platen tube headers within an annular space of the radiant syngas cooler and a plurality of downcomer tubes having vertical portions disposed circumferentially around an exterior of the radiant syngas cooler and horizontal portions extending into the annular space. The horizontal portions include inner portions disposed within the annular space and outer portions disposed outside of the annular space and a first plurality of elbow joints coupled between the vertical portions and the outer portions of the plurality of the downcomer tubes. The system includes a second plurality of elbow joints coupled to the internal portions and a plurality of concentric reducers coupled to the second plurality of elbow joints. The system includes a plurality of downcomer branches extending from the concentric reducers, where at least a portion of the plurality of downcomer branches is coupled to the one or more platen tube headers, and a cage bottom header disposed below the one or more platen tube headers, where at least one downcomer branch of the plurality of downcomer branches is coupled to the cage bottom header.

In a third embodiment, a system includes a gasifier which generates a syngas fluidly coupled to a radiant syngas cooler. The radiant syngas cooler includes a plurality of platen tubes extending from one or more platen tube headers within the cooler and a plurality of downcomer tubes disposed circumferentially around the cooler, wherein the plurality of platen tubes are configured to cool a syngas flowing through the cooler. The system includes a first plurality of elbow joints coupled between a vertical portion of the downcomer tube and a horizontal portion of the downcomer tube, where the elbow joints are configured to extend the horizontal portion of each downcomer tube in a radially inward direction relative to the cooler. The radiant syngas cooler includes a cooler wall, where the horizontal portion of each downcomer tube includes an internal portion and an external portion. The cooler includes a second plurality of elbow joints coupled between each internal portion of each downcomer tube and a plurality of concentric reducers. The cooler includes a plurality of downcomer branches extending from each concentric reducer, where one or more of the branches is coupled to an adjacent platen tube header. The cooler includes a cage bottom header disposed below the platen tube header, wherein at least one branch of the plurality of downcomer branches is coupled to the cage bottom header. The hot syngas transfers heat to a cooling fluid flowing through the plurality of platen tubes and cage tubes. A syngas processor is disposed downstream of the radiant syngas cooler configured to treat the flow of the cooled syngas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed below, the disclosed embodiments include a radiant syngas cooler (RSC) having a plurality of downcomer tubes positioned circumferentially around a wall (which may also be referred to as an outer shell) of the RSC. Disposing the downcomer tubes around the perimeter of the RSC enables the inner diameter of the RSC to be reduced compared to when the downcomer tubes are disposed within the annular space of the RSC. Reducing the inner diameter of the RSC enables the RSC to be moved from one location to another location more easily by reducing the overall size of the RSC. Moreover, disposing the downcomer tubes outside the RSC simplifies the piping in the dome section portion of the RSC. Disposing a portion of the downcomer tubes externally to the RSC also enables the portion of the downcomer tubes disposed external to the RSC to be made of lower cost materials. In one example, the portion of the downcomer tubes inside the RSC, along with the downcomer branches, the inner elbow, and any other components inside the RSC may be made of a high nickel alloy. The portion of the downcomer tube and the components outside the RSC (e.g., the outer elbow, the bleed line) may be made of carbon steel (e.g., SA 106 pipe).

As described further below, the downcomer tubes extend axially and externally relative to the wall of the RSC, and a portion of the downcomer tubes extend into the annular space of the RSC through the wall. The downcomer tubes are configured to flow cooling water downwardly around the perimeter of the RSC. As the syngas flows through the RSC, the hot syngas generated in the gasifier is initially cooled using the cooling water supplied by the downcomer tubes to a plurality of platen tubes and cage tubes positioned closer to the hot gas path of the RSC. The downcomer tubes of the present disclosure may include a number of features that facilitate stable operation of the RSC over time.

For example, an expansion joint (e.g., an expansion bellow) of the downcomer tubes may enable the downcomer tubes to expand or retract in response to the cooling fluid (e.g., water) flowing through the downcomer tube (e.g., in response to temperature changes). The downcomer tubes may also have a bleed line configured to enable withdrawal of excess water (e.g., high pressure steam).

Inside the RSC wall, the downcomer tube is coupled to an inner elbow. The inner elbow forms an angle and is coupled to a pipe fitting, such as a concentric reducer. Downcomer branches disposed along the sides of the concentric reducer may have an elbow configured to couple the downcomer branches to platen tube headers while the downcomer branches extending from the bottom of the concentric reducer have an elbow with an angle of approximately 45 degrees configured to couple the downcomer branches to a cage bottom header. These configurations are described in further details below.

Figure 1:
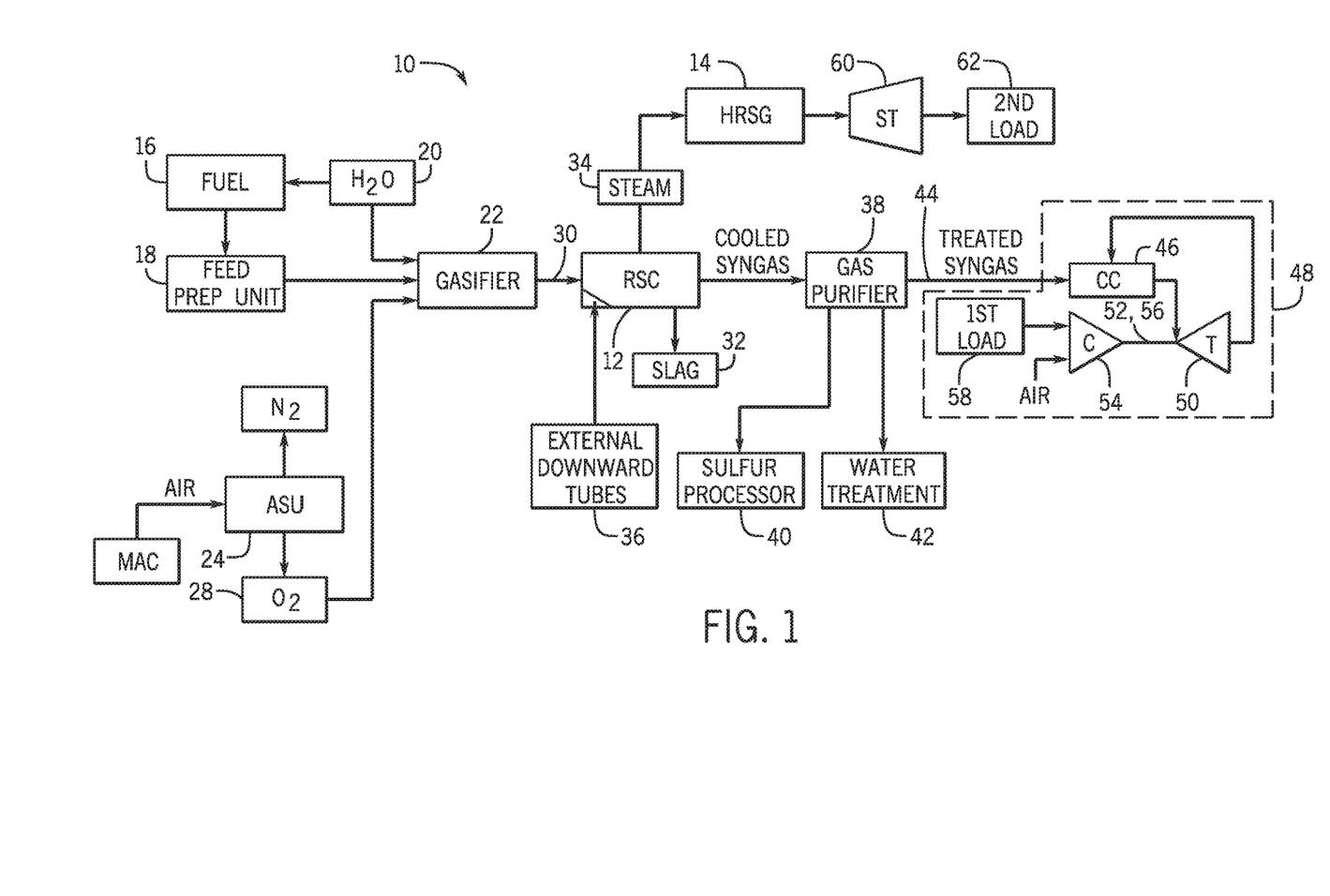
FIG. 1 is a block diagram of an embodiment of an IGCC power plant incorporating a radiant syngas cooler where the steam generated by the radiant syngas cooler is directed to a heat recovery steam generator.

Turning now to the figures, FIG. 1 is a block diagram of an embodiment of an IGCC power plant 10 incorporating a radiant syngas cooler wherein steam generated by the radiant syngas cooler (RSC) 12 is directed to a heat recovery steam generator 14. The RSC 12 has external downcomer tubes, as described in further detail below.

Other elements of the IGCC system 10 may include a fuel source 16, which may be a solid or a liquid, which may be utilized as a source of energy for the IGCC power plant 10. The fuel source 16 may include coal, petroleum coke, oil, biomass, wood-based materials, agricultural wastes, tars, coke oven gas and asphalt, or other carbon containing items. The fuel of the fuel source 16 may be passed to a feedstock preparation unit 18. The feedstock preparation unit 18 may, for example, resize or reshape the fuel source 16 by chopping, milling, shredding, pulverizing, briquetting, or palletizing the fuel source 16 to generate feedstock. Additionally, water 20, or other suitable liquids may be added to the fuel source 16 in the feedstock preparation unit 18 to create slurry feedstock (and/or for separate introduction to a gasifier 22). In other embodiments, no liquid is added to the fuel source 16, thus yielding dry feedstock. In other embodiments, the feedstock preparation unit 18 may be omitted if the fuel source 16 is a liquid. The gasifier 22 is coupled to the RSC 12.

The IGCC power plant 10 may further include an air separation unit (ASU) 24. The ASU 24 may operate to separate air into component gases by, for example, distillation techniques. The ASU 24 may separate oxygen 28 from the air supplied to it from a supplemental air compressor 26, and the ASU 24 may transfer the separated oxygen 28 to the gasifier 22.

The feedstock may be passed to the gasifier 22 from the feedstock preparation unit 18. The gasifier 22 may convert the feedstock into a syngas 30, which is primarily a combination of carbon monoxide (CO) and hydrogen. This conversion may be accomplished by subjecting the feedstock to a controlled amount of steam and oxygen at elevated pressures, e.g., from approximately 20 bar to 85 bar, and temperatures, e.g., approximately 700 degrees C. to 1600 degrees C., depending on the type of gasifier 22 utilized. The gasification process may include the feedstock undergoing a pyrolysis process, whereby the feedstock is heated. Temperatures inside the gasifier 22 may range from approximately 150 degrees C. to 700 degrees C. during the pyrolysis process, depending on the fuel source 16 utilized to generate the feedstock.

The gasifier 22 utilizes steam and oxygen 28 to allow some of the feedstock to be burned to produce CO and release energy, which drives a second reaction that converts further feedstock to hydrogen and additional $CO_2$. In this way, the gasifier 22 produces the synthesis gas 30. This synthesis gas 30 may include approximately 85% of CO and hydrogen in equal proportions, as well as $CH_4$, HCl, HF, COS, $NH_3$, HCN, and $H_2S$ (based on the sulfur content of the feedstock). The synthesis gas 30 may be termed untreated syngas, because it includes, for example, $H_2S$. The gasifier 22 may also generate waste, such as slag 32, which may be a wet ash material. This slag 32 may be removed from the radiant syngas cooler (RSC) 12 and disposed of.

The syngas 30 is cooled in the RSC 12, as described in further detail below. The syngas 30 is cooled in a radiant transfer type of heat exchanger, and steam 34 is generated in a plurality of cage tubes and platen tubes. The cooled syngas 30 may exit the RSC 12 and enters a gas purifier 38.

In one embodiment, the gas purifier 38 may be a syngas scrubber and/or water gas shift reactor. The gas purifier 38 may scrub the untreated syngas to remove the HCl, HF, COS, HCN, and $H_2S$ from the untreated syngas 30, which may include separation of sulfur in a sulfur processor 40. Furthermore, the gas purifier 38 may separate salts from the untreated syngas 30 via a water treatment unit 42 that may utilize water purification techniques to generate usable salts from the untreated syngas.

Treated syngas 44 may be transmitted to a combustor 46, e.g., a combustion chamber, of a gas turbine engine 48 as combustible fuel. The gas turbine engine 48 may include a turbine 50, a drive shaft 52, and a compressor 54, as well as the combustor 46. The combustor 46 may receive fuel, such as syngas, which may be injected under pressure from fuel nozzles.

The drive shaft 52 may connect the turbine 50 to the compressor 54. The compressor 54 may include blades coupled to the drive shaft 52. Thus, rotation of turbine blades in the turbine 50 may cause the drive shaft 52 connecting the turbine 50 to the compressor 54 to rotate blades within the compressor 54. This rotation of blades in the compressor 54 causes the compressor 54 to compress air received via an air intake in the compressor 54. The compressed air may then be fed to the combustor 46 and mixed with fuel and compressed nitrogen to allow for higher efficiency combustion. The drive shaft 52 may also be connected to load 58, which may be a stationary load, such as an electrical generator for producing electrical power, for example, in a power plant. The load 58 may be any suitable device that is powered by the rotational output of the gas turbine engine 48.

Returning to the discussion of the RSC 12, the steam 34 generated by the RSC 12 may be directed to the heat recovery steam generator (HRSG) 14. The HRSG 14 may be coupled to a steam turbine engine 60, which may drive a second load 62. The second load 62 may also be an electrical generator for generating electrical power. However, both the first and second loads 58, 62 may be other types of loads capable of being driven by the gas turbine engine 48 and steam turbine engine 60. In addition, although the gas turbine engine 48 and steam turbine engine 60 may drive separate loads 58 and 62, as shown in the illustrated embodiment, the gas turbine engine 48 and steam turbine engine 60 may also be utilized in tandem to drive a single load via a single shaft. The specific configuration of the steam turbine engine 60, as well as the gas turbine engine 48, may be implementation-specific and may include any combination of sections.

Figure 2:
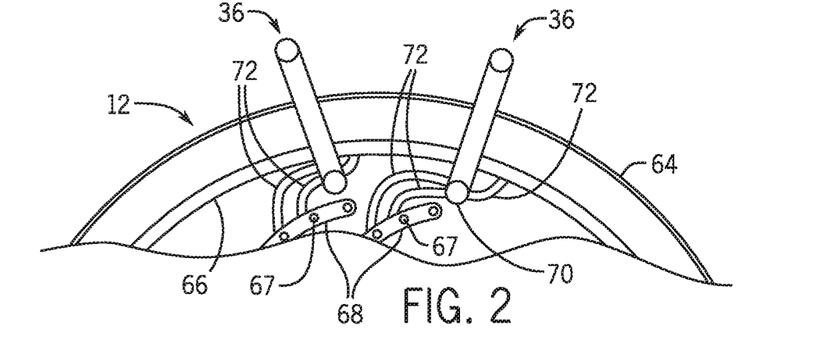
FIG. 2 is a partial schematic view of an embodiment of the radiant syngas cooler of FIG. 1 depicting a top view of the cooler at a bottom section.

As described above, the configuration of the downcomer tubes 36 may be further understood with reference to FIG. 2. More specifically, FIG. 2 is a schematic top view of an embodiment of the bottom section of the RSC 12 of FIG. 1. It should be noted that a bottom portion of the RSC 12 may be coupled to a slag dump to collect slag, or other equipment. As shown, the RSC 12 may be circumferentially surrounded by a plurality of the downcomer tubes 36. Cooling water may be fed through the downcomer tubes 36 from a cooling water source, such as boiler feed water available in the plant. Generally, high pressure steam may be generated from the cooling water flows through the downcomer tubes 36 disposed around the perimeter of the RSC 12. As the syngas 30 flows through the RSC 12, the hot syngas 30 is initially cooled in radiant heat transfer type features of the RSC 12, such as internal heat transfer tubes, a wall, and so forth. Steam 34, generated by the heat transfer, may then be directed to another area of the plant, such as the HRSG 14.

As described above, disposing the downcomer tubes 36 around the perimeter of the RSC 12 enables the inner diameter of the RSC 12 to be reduced compared to when the downcomer tubes 36 are disposed within the annular space of the RSC 12. Though only two downcomer tubes 36 are shown, a plurality of the downcomer tubes 36 surround the RSC 12 externally along the perimeter of the RSC 12. The downcomer tubes 36 may be spaced substantially equidistantly around the perimeter of the RSC 12. For example, pairs of the downcomer tubes 36 may be spaced apart from adjacent tubes 36, which are in turn separated from another pair by an equal distance. In certain embodiments, the downcomer tubes 36 may be spaced at varying intervals along the perimeter of the RSC 12 or clustered in one area in other embodiments. The downcomer tubes 36 extend from outside the RSC 12 and extend into an annular space of the RSC 12 defined by a wall 64, as explained in detail below with reference to FIG. 3.

Other equipment is also disposed in the annular space of the RSC 12, including, but not limited to a cage bottom header 66, a plurality of platen tubes 67, one or more platen tube headers 68, one or more concentric reducers 70, and a plurality of downcomer branches 72. As shown in the schematic side view of FIG. 3, an elbow joint 74 may couple the downcomer tube 36 to concentric reducer 70, which are shown and described further with reference to FIG. 8. The plurality of downcomer branches 72 extend from the concentric reducer 70 on one end and couple to a header on the other end. Some of the downcomer branches 72 couple to the cage bottom header 66, while other downcomer branches 72 couple to the platen tube headers 68. Each downcomer tube 36 may be associated with one or more of the downcomer branches 72. For example, the downcomer tubes 36 may each be associated with between 1 and 10 downcomer branches, such as 1, 2, 3, 4, 5, 6, 7, 8, 9, or 10 branches. Further, the plurality of downcomer branches 72 may be disposed in the same or different orientations to facilitate coupling of the downcomer branches to various features including the cage bottom header 66 the platen tube headers 68.

Figures 3, 4:
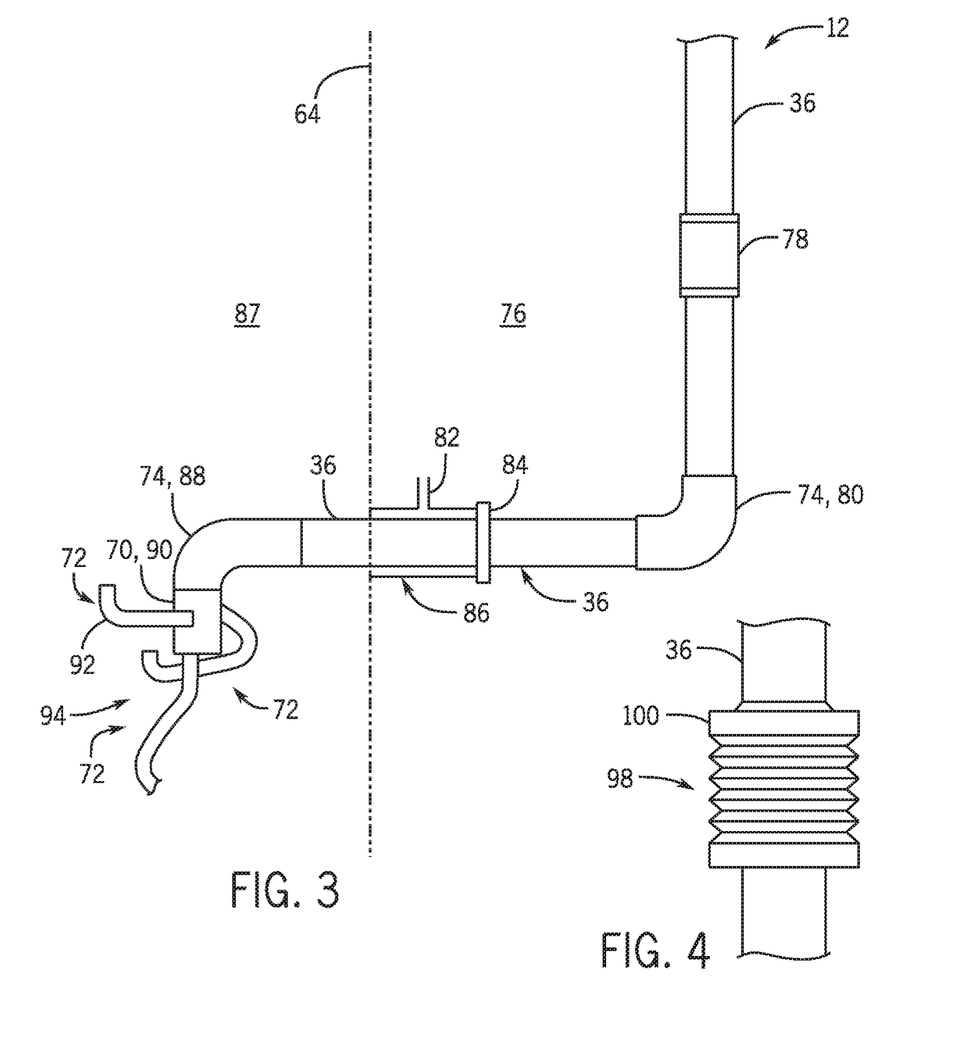
FIG. 3 is a partial schematic view of an embodiment of the radiant syngas cooler of FIG. 1 illustrating a downcomer tube extending through the cooler, wherein a portion of the downcomer tube extends inside a wall of the cooler and a portion of the downcomer tube remains external to the wall of the cooler.
FIG. 4 is a schematic view of an embodiment of an expansion bellow disposed along the downcomer tube of FIG. 3.

As explained above, the downcomer tubes 36 are disposed circumferentially around the outer wall 64 of the RSC 12 and extend into the annular space of the RSC 12. As shown in FIG. 3, most of the downcomer tube 36 remains in an outside area from the RSC 12. An expansion joint (e.g., an expansion bellow) 78 is utilized along the downcomer tube 36 to enable the downcomer tubes 36 to expand or retract in response to thermal expansion and retraction, for example differential thermal expansion between the RSC 64 and the downcomer assembly 36. Details of the expansion joint 78 may be further understood with reference to FIG. 4. The downcomer tube 36 may also include an outer elbow 80. The outer elbow 80 forms an angle and transitions the downcomer tube 36 from being substantially parallel (e.g., a downflow portion) to the outer wall 64 of RSC 12 above the elbow to substantially perpendicular (e.g., a crossflow portion) to the outer wall 64 of the RSC 12. The downcomer tube 36 may be coupled to the RSC 12 via a nozzle sleeve 86. The inner diameter of the nozzle sleeve 86 may be greater than the outer diameter of the downcomer tube 36 and may have any suitable geometry. In certain embodiments, purge gas is injected via line 82 into the annular space between the nozzle sleeve 86 and the downcomer tube 36.

The downcomer tube 36 may also include a flange assembly 84 (e.g., one or more flange plates) to couple the nozzle sleeve 86 to the downcomer tube 36. The nozzle sleeve 86 may be welded or otherwise coupled to the flange assembly 84. The nozzle sleeve 86 is welded to the RSC wall 64 at the other end.

From the nozzle 86, the downcomer tube 36 extends into an inner area 87 of the RSC 12, which is separated from the outside area 76 by the RSC wall. Inside the RSC wall, the downcomer tube 36 is coupled to an inner elbow 88. The inner elbow 88 forms an angle and is coupled to the concentric reducer 70 via welding, fusing, brazing, or some other connection method.

The downcomer branches 72 may have a smaller diameter than the downcomer tubes 36. For example, the diameter of the downcomer branches 72 may be a percentage of the diameter of the downcomer tubes 36, such as 25 to 75%, 33 to 65%, 40 to 50% and all percentages there between. The downcomer branches 72 disposed along the sides of the concentric reducer 70 may have an elbow 92 that angles the downcomer branches toward the platen tube headers 68. The downcomer branches 72 extending from the bottom of the concentric reducer 70 have an elbow 94 that angles the downcomer branch 72 to the cage bottom header 66.

The portion of the downcomer tubes 36 and the components outside the RSC wall 64 may be manufactured of different materials than the portion of the downcomer tube 36 and the components inside the RSC wall 64. The portion of the downcomer tube 36 and the components outside the RSC 12 are subject to lower temperatures than the portion of the downcomer tubes inside the RSC 12. As such, the portion of the downcomer tubes inside the RSC, along with the downcomer branches 72, the inner elbow 88, and any other components inside the RSC 12 (e.g., cage tubes described in FIGS. 6-7, or the nozzle 86) may be manufactured from any suitable material, such as a superalloy configured to have superior temperature strength, ductility, and oxidation resistance relative to the portion of the downcomer tubes 36 that are outside of the RSC wall 64. In one non-limiting example, the portion of the downcomer tubes 36 inside the RSC 12, along with the downcomer branches 72, the inner elbow 88, and any other components inside the RSC 12 may be made of a high nickel alloy. In this example, the portion of the downcomer tube 36 and the components outside the RSC 12 (e.g., the outer elbow, the bleed line) may be made of materials that are generally less costly and do not necessarily have the same material properties as the materials used for the downcomer tubes 36 within the RSC 12. A non-limiting example of such material includes carbon steel (e.g., SA 106 pipe). Between the nozzle 86 and the portion of the downcomer tube 36 adjacent to the nozzle 86 and closer to the RSC 12, a transitional material may be used to mitigate distortion of the joint due to dissimilar material welding. For example, the transitional material may include Inconel™ 625 high nickel alloy available from Special Metals corporation of Hartford, N.Y.

As described above, the expansion joint 78 (e.g., an expansion bellow) is positioned along the downcomer tube 36 and is configured to enable the downcomer tubes 36 to expand or retract in response to thermal fluctuations. FIG. 4 is a schematic view of an embodiment of the expansion joint 78 disposed along the downcomer tube 36 of FIG. 3. The expansion joint 78 is manufactured of carbon steel and stabilizes the portion of the downcomer tube 36 above and below the expansion joint 78. The expansion joint 78 enables thermal expansion of the downcomer tube 36 as the fluid flows through the tube 36. The expansion bellow includes a plurality of ridges 98. On either side of the ridges 98, the expansion joint 78 may include a flange 100 that is welded, fused, brazed or otherwise coupled to the adjacent downcomer tube 36. The position of the expansion joint 78 relative to the downcomer tube 36 may be further understood with reference to FIG. 5.

Figure 5:
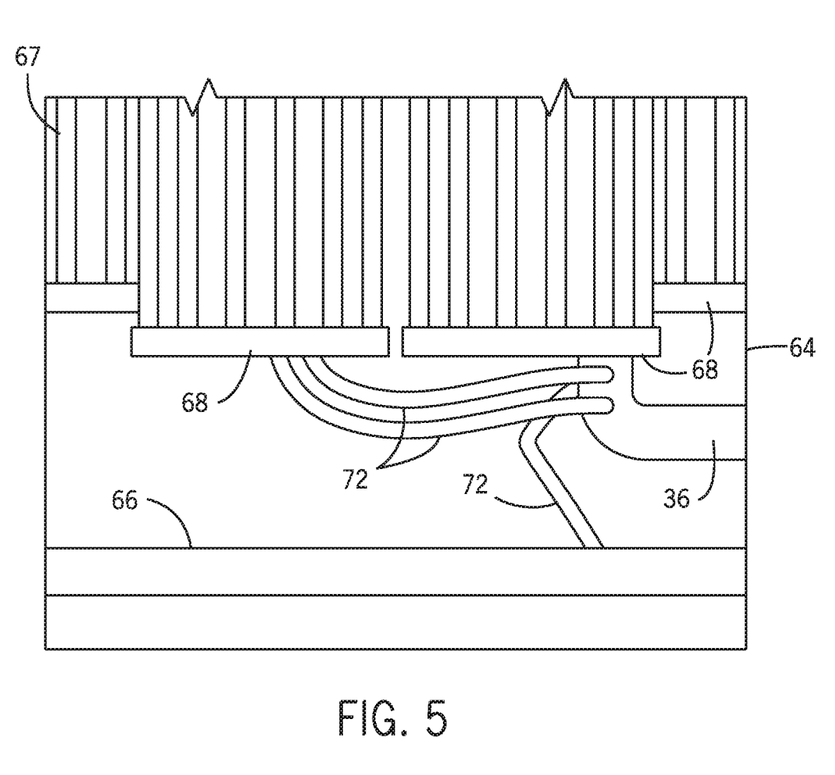
FIG. 5 is a partial cross sectional view of an embodiment of the radiant syngas cooler of FIG. 1 illustrating components disposed inside the wall of the RSC.

FIG. 5 is a partial cross-sectional view of the components disposed outside the RSC and the components disposed inside the RSC. A cooling medium (e.g., water) flows from the downcomer tube 36 to downcomer branches 72 (e.g., heat exchange tubes). The cooling medium (e.g., water) flows from the downcomer branches 72 to the cage bottom header 66 and the platen tube header 68. The water flows through the platen tubes 67 (from the platen tube header 68) and through the cage tubes (not shown) from the cage bottom header 66. As shown, the platen tube headers 68 provide a cooling medium to the plurality of platen tubes 67. The platen tubes 67 may also have a flow of cooling fluid (e.g., water) flowing through the platen tubes 67 (e.g., heat exchange tubes).

Figure 6:
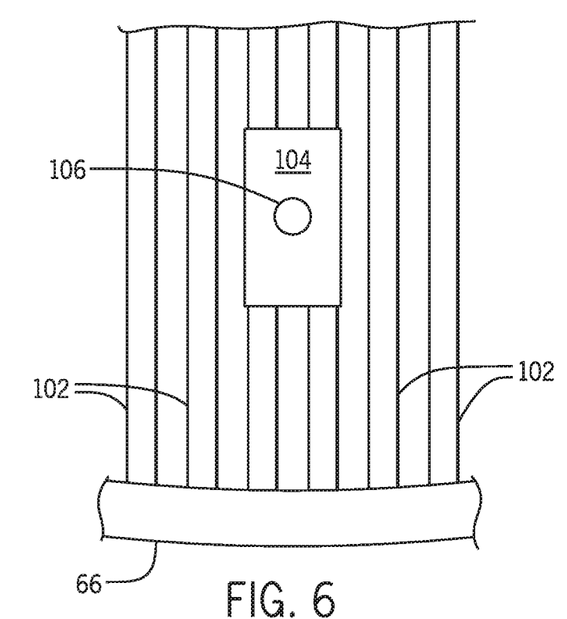
FIG. 6 is a partial schematic view of an embodiment of the radiant syngas cooler of FIG. 1 illustrating an external view of a plurality of cage tubes coupled to a cage bottom header.
Figure 7:
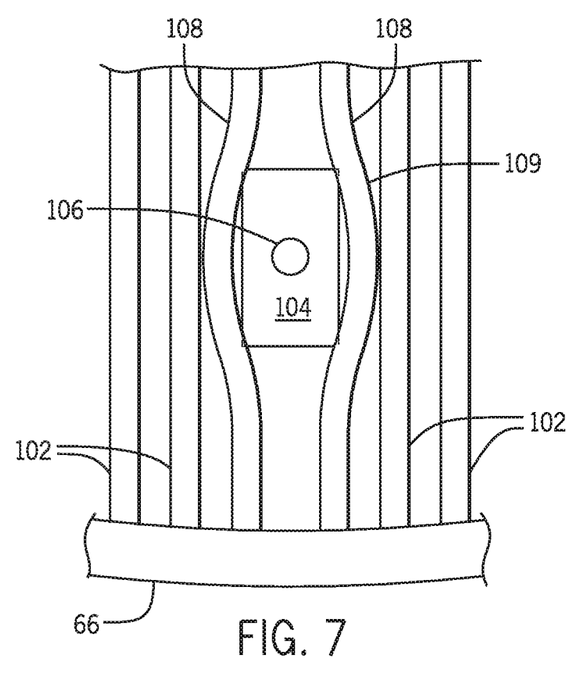
FIG. 7 is a partial schematic view of an embodiment of the radiant syngas cooler of FIG. 1 illustrating an internal view of the plurality of cage tubes coupled to a cage bottom header.
Figure 8:
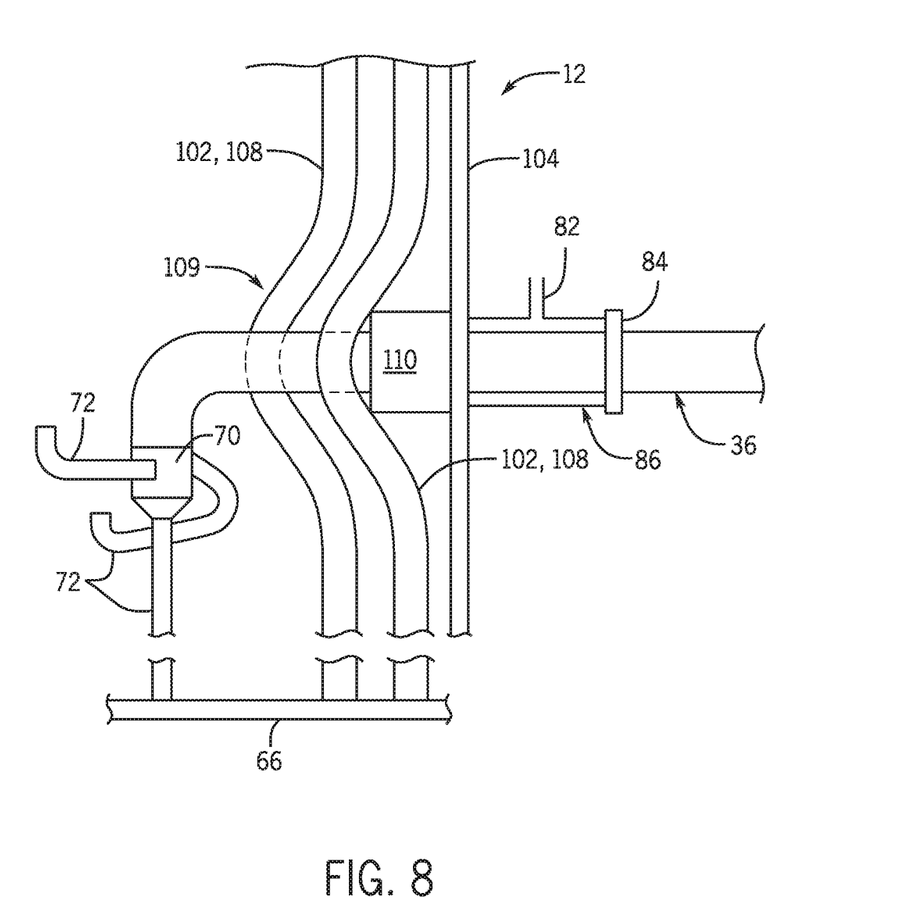
FIG. 8 is a partial schematic side view of an embodiment of the radiant syngas cooler of FIG. 1 illustrating a portion of the plurality of cage tubes modified and coupled to the cage bottom header.

As set forth above, the RSC 12 is configured such that the downcomer tubes 36 extend axially along the RSC 12 at its outside and transition inwardly through the RSC wall 64. The downcomer tubes 36 also extend through an opening in a plurality of cage tubes 102 extending from the cage bottom header 66, as shown in FIGS. 6-8. FIG. 6 is a partial schematic view of an embodiment of the RSC 12 of FIG. 1 illustrating an outside view of a plurality of the cage tubes 102 coupled to the cage bottom header 66. As with other components disposed inside the RSC 12, the cage tubes 102 may be made of a high nickel alloy. The cage tubes 102 may be disposed circumferentially around the platen tubes 67. Generally, a group of cage tubes 102 may be coupled to the cage bottom header 66 for each downcomer tube 36.

A receiving plate 104 may be positioned against some of the plurality of cage tubes 102 and is configured to seal against the downcomer tube 36 to maintain an internal pressure of the RSC 12. The receiving plate 104 includes a downcomer tube receptacle 106 for receiving the downcomer tube 36 and in some embodiments, is sized to receive the nozzle 86. The receiving plate 104 may be welded, fused, brazed, or otherwise coupled to some of the plurality of cage tubes 102, and may form or be sealed against a portion of the RSC wall 64. The receiving plate 104 may be made of a material capable of withstanding the high temperatures of the RSC 12. Many of the cage tubes 102 extend substantially parallel to the wall of the RSC wall 64. However, the shape of some of the cage tubes 102 may be modified to accommodate the receiving plate 104. As shown in FIG. 7, a portion 108 of the cage tubes 102 that are adjacent to the receiving plate 104 may be modified to have a bend 109. The modified cage tubes 108 provide a gap or a space to fit a box seal, as explained with reference to FIG. 8.

FIG. 8 is a partial schematic side view of an embodiment of the RSC 12 of FIG. 1 illustrating the bend 109 in the modified cage tubes 108 that accommodates a box seal 110. The box seal 110 may be welded, fused, brazed, or otherwise coupled to the receiving plate 104. In other embodiments, the box seal 110 may simply be placed against the modified cage tubes 108 and the receiving plate 104 to form a compressive seal. Generally, the box seal 110 helps reduce the escape of hot syngas from the RSC 12. In addition, the box seal is designed to accommodate differential thermal expansion between the tube cage and the vessel wall. As described above, the downcomer tube 36 is coupled to the concentric reducer 70 that the downcomer branches 72 are coupled to.

Technical effects of the invention disposing a plurality of downcomer tubes circumferentially outside a wall of the RSC. Disposing the downcomer tubes around the perimeter of the RSC enables the inner diameter of the RSC to be reduced compared to when the downcomer tubes are disposed within the annular space of the RSC. Moreover, disposing the downcomer tubes outside the RSC simplifies the piping in the dome section portion of the RSC. Disposing the downcomer tubes externally to the RSC also enables the portion of the downcomer tubes disposed external to the RSC to be made of lower cost materials. A portion of each downcomer tube remains outside the wall of the RSC. Inside the RSC wall, the downcomer tube is coupled to an inner elbow and is coupled to a concentric reducer. The downcomer branches disposed along the sides of the concentric reducer may have an elbow with an angle of approximately 90 degrees configured to couple the downcomer branches to the platen tube headers, and the downcomer branches extending from the bottom of the concentric reducer have an elbow with an angle of approximately 45 degrees configured to couple the downcomer branches to the cage bottom header.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a radiant syngas cooler configured to receive and cool syngas generated in a gasifier;
   an outer shell of the radiant syngas cooler defining an annular space of the radiant syngas cooler;
   a heat exchange tube of the radiant syngas cooler positioned within the annular space and configured to flow a cooling medium, wherein the heat exchange tube is configured to enable heat exchange between the syngas and the cooling medium to cool the syngas; and
   a downcomer tube of the radiant syngas cooler configured to supply the cooling medium to the heat exchange tube, wherein the downcomer tube comprises a downflow portion positioned outside of the outer shell of the radiant syngas cooler, wherein the downflow portion of the downcomer tube extends axially along a length of the outer shell of the radiant syngas cooler at least to a bottom portion of the outer shell, such that the downflow portion is fluidly coupled to a header, and the header fluidly couples the downcomer tube to the heat exchange tube.

2. The system of claim 1, wherein the downcomer tube comprises a first downcomer branch tube and a second downcomer branch tube, wherein the first downcomer branch tube fluidly couples the downcomer tube to the header, and the second downcomer branch tube fluidly couples the downcomer tube to an additional header.

3. The system of claim 2, wherein the header is a platen tube header fluidly coupling the first downcomer branch tube to a plurality of platen tubes configured to flow the cooling medium, and the additional header is a cage tube header fluidly coupling the second downcomer branch tube to a plurality of cage tubes configured to flow the cooling medium.

4. The system of claim 3, wherein the plurality of cage tubes surround the plurality of platen tubes, and the radiant syngas cooler comprises additional platen headers fluidly coupling additional pluralities of platen tubes to additional downcomer tubes, wherein the additional downcomer tubes each have respective downflow portions positioned outside of the annular space of the radiant syngas cooler.

5. The system of claim 3, wherein the downcomer tube comprises a crossflow portion extending from the downflow portion and into the annular space of the radiant syngas cooler, wherein the crossflow portion extends through an opening in the plurality of cage tubes.

6. The system of claim 5, wherein the plurality of cage tubes have a bent portion accommodating a receptacle for the downcomer tube.

7. The system of claim 3, wherein the downcomer tube comprises a third downcomer branch tube fluidly coupling the downcomer tube to an additional platen tube header, the additional platen tube header being fluidly coupled to an additional plurality of platen tubes.

8. The system of claim 2, wherein the first downcomer branch tube and the second downcomer branch tube extend in opposite directions from the downcomer tube.

9. The system of claim 2, wherein the first downcomer branch tube and the second downcomer branch tube extend from a concentric reducer of the downcomer tube.

10. The system of claim 1, wherein the downflow portion of the downcomer tube comprises an expansion joint configured to allow expansion and contraction resulting from thermal fluctuations.

11. The system of claim 1, wherein the downcomer tube comprises a downflow portion and a crossflow portion extending from the downflow portion and into the annular space of the radiant syngas cooler, wherein a region of the crossflow portion positioned within the annular space is constructed from one or more materials capable of withstanding higher temperatures compared to materials of the downflow portion.

12. The system of claim 1, wherein the downcomer tube comprises a bleed line positioned outside of the outer shell of the radiant syngas cooler.

13. The system of claim 1, wherein the downcomer tube is a first downcomer tube, and the radiant syngas cooler comprises a second downcomer tube, wherein the first and second downcomer tubes comprise a first downcomer branch tube and a second downcomer branch tube, respectively, wherein the first downcomer branch tube fluidly couples the first downcomer tube to a first platen tube header, the second downcomer branch tube fluidly couples the second downcomer tube to a second platen tube header separate from the first, and the first and second downcomer branch tubes overlap one another.

14. The system of claim 13, wherein the first downcomer branch tube comprises a bend that allows the second downcomer branch tube to access the second platen tube header.

15. A system, comprising:
    a radiant syngas cooler comprising a plurality of platen tubes extending from one or more platen tube headers within an annular space of the radiant syngas cooler and a plurality of downcomer tubes having vertical portions disposed circumferentially around an exterior of the radiant syngas cooler and horizontal portions extending into the annular space, wherein the horizontal portions comprise inner portions disposed within the annular space and outer portions disposed outside of the annular space;

a first plurality of elbow joints coupled between the vertical portions and the outer portions of the plurality of the downcomer tubes;

a second plurality of elbow joints coupled to the internal portions and a plurality of concentric reducers coupled to the second plurality of elbow joints;

a plurality of downcomer branches extending from the concentric reducers, wherein at least a portion of the plurality of downcomer branches is coupled to the one or more platen tube headers; and a cage bottom header disposed below the one or more platen tube headers, wherein at least one downcomer branch of the plurality of downcomer branches is coupled to the cage bottom header.

16. The system of claim 15, wherein the first plurality of elbow joints, the vertical portions, and the outer portions each comprise carbon steel.

17. The system of claim 15, wherein the concentric reducers, the second plurality of elbow joints, and the internal portions each comprise a superalloy.

18. The system of claim 15, wherein the first plurality of elbow joints, the vertical portions, and the outer portions are each constructed from materials that are more heat resistant than materials used to construct the first plurality of elbow joints, the vertical portions, and the outer portions.

19. The system of claim 15, wherein a diameter of the downcomer tubes is about twice that a diameter of the plurality of downcomer branches.

20. A system, comprising:

a gasifier configured to generate a syngas fluidly coupled to a radiant syngas cooler;

the radiant syngas cooler comprising a plurality of platen tubes extending from one or more platen tube headers within the cooler and a plurality of downcomer tubes disposed circumferentially around the cooler, wherein the plurality of platen tubes are configured to cool a syngas flowing through the cooler;

a first plurality of elbow joints coupled between a vertical portion of the downcomer tube and a horizontal portion of the downcomer tube, wherein the elbow joints are configured to extend the horizontal portion of each downcomer tube in a radially inward direction relative to the cooler;

a cooler wall of the radiant syngas cooler, wherein the horizontal portion of each downcomer tube comprises an internal portion that is internal to the cooler wall and an external portion that is external to the cooler wall;

a second plurality of elbow joints coupled between each internal portion of each downcomer tube and a plurality of concentric reducers;

a plurality of downcomer branches extending from each concentric reducer, wherein one or more of the branches is coupled to an adjacent platen tube header;

a cage bottom header disposed below the platen tube header, wherein at least one branch of the plurality of downcomer branches is coupled to the cage bottom header; and wherein the hot syngas is configured to transfer heat to a cooling fluid flowing through the plurality of platen tubes and the plurality of cage tubes; and a syngas processor disposed downstream of the radiant syngas cooler configured to treat the flow of the cooled syngas.

\* \* \* \* \*